May 8, 1951  C. A. LAWS ET AL  2,552,009
EXPANDED SWEEP AND CALIBRATED CATHODE-RAY TUBE TRACE
Filed July 30, 1947  2 Sheets-Sheet 1

INVENTORS
C.A. LAWS
R.J. PUMPHREY
O.L. RATSEY
D.S. WATSON
BY Kenyon & Kenyon
THEIR ATTORNEYS INVENTORS
C. A. LAWS
R. J. PUMPHREY
O. L. RATSEY
D. S. WATSON
BY Kenyon & Kenyon
THEIR ATTORNEYS.

Patented May 8, 1951

2,552,009

UNITED STATES PATENT OFFICE 2,552,009

EXPANDED SWEEP AND CALIBRATED CATHODE-RAY TUBE TRACE

Cecil Alfred Laws, Boreham Wood, Richard Julius Pumphrey, Cambridge, and Osbert Linn Ratsey and Daniel Stewart Watson, Haslemere, England, assignors to National Research Development Corporation, a corporation of Great Britain and Northern Ireland Application July 30, 1947, Serial No. 764,810
In Great Britain August 27, 1943

Section 1, Public Law 690, August 8, 1946
Patent expires August 27, 1963

22 Claims. (Cl. 315—26)

This invention is for improvements in or relating to object-locating and -detecting systems of the type in which electro-magnetic or acoustic radiation is transmitted towards a distant object and signals reflected or reradiated from the object, hereinafter referred to as echoes, are reproduced on the luminescent screen of a cathode ray tube. The range of the object is determined by measuring, along a time-base sweep produced on the screen of the cathode ray tube the time-interval between the transmission and receipt of an echo-signal corresponding thereto. When the radiation is of radio-frequency such a system is known generally as a radar system. The direction in azimuth and elevation of the object can also be measured by comparing the amplitudes of the echo-signal for different adjustments or orientations of the aerial system.

To facilitate these observations, it is desirable to calibrate the time-sweep electronically and also to provide means for expanding or magnifying at will, the particular part of the time-sweep which surrounds a selected signal-trace so as to enable the latter to be subjected to a more detailed examination.

The present invention provides an object-locating and -detecting system in which signals reflected or reradiated from objects illuminated by transmitted electromagnetic or acoustic radiation are displayed on a type A-scan cathode ray tube, wherein the cathode ray tube is provided with two correlated time-sweeps, one of which presents echo-signals for observation and the second of which presents a series of calibration markers generated by calibation voltages locked to the repetition-frequency of the time base of the correlated-time-sweeps, and means are provided for increasing the speed of both time-sweeps for a short distance on either side of a selected echo-signal trace and simultaneously for moving a datum calibration mark along the second time-sweep into alignment with the selected echo-signal trace.

Figure 1:
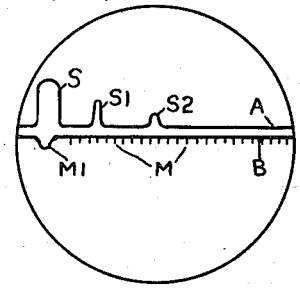
Figure 1A:
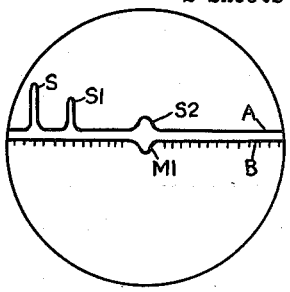
Figure 2:
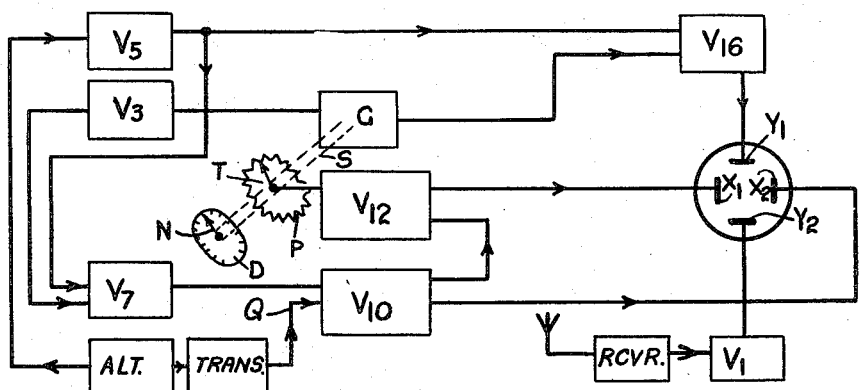
Figure 3A:
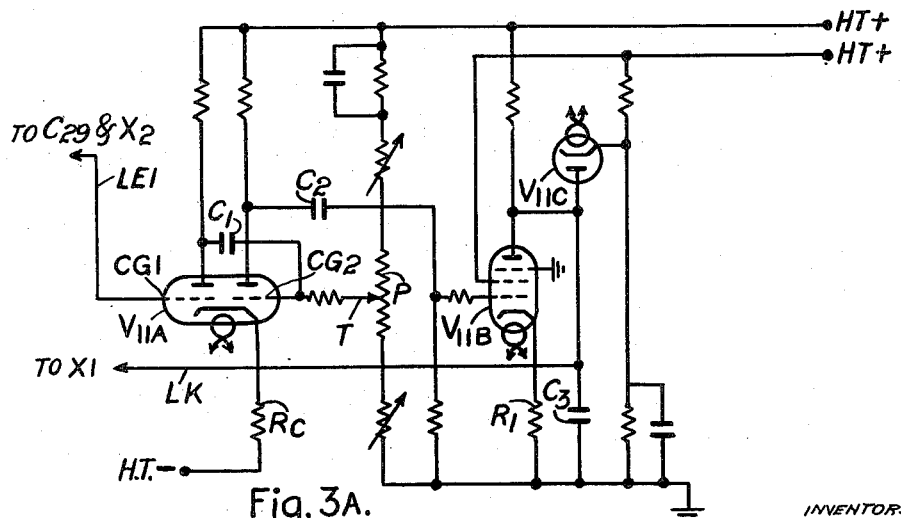
Figure 3:
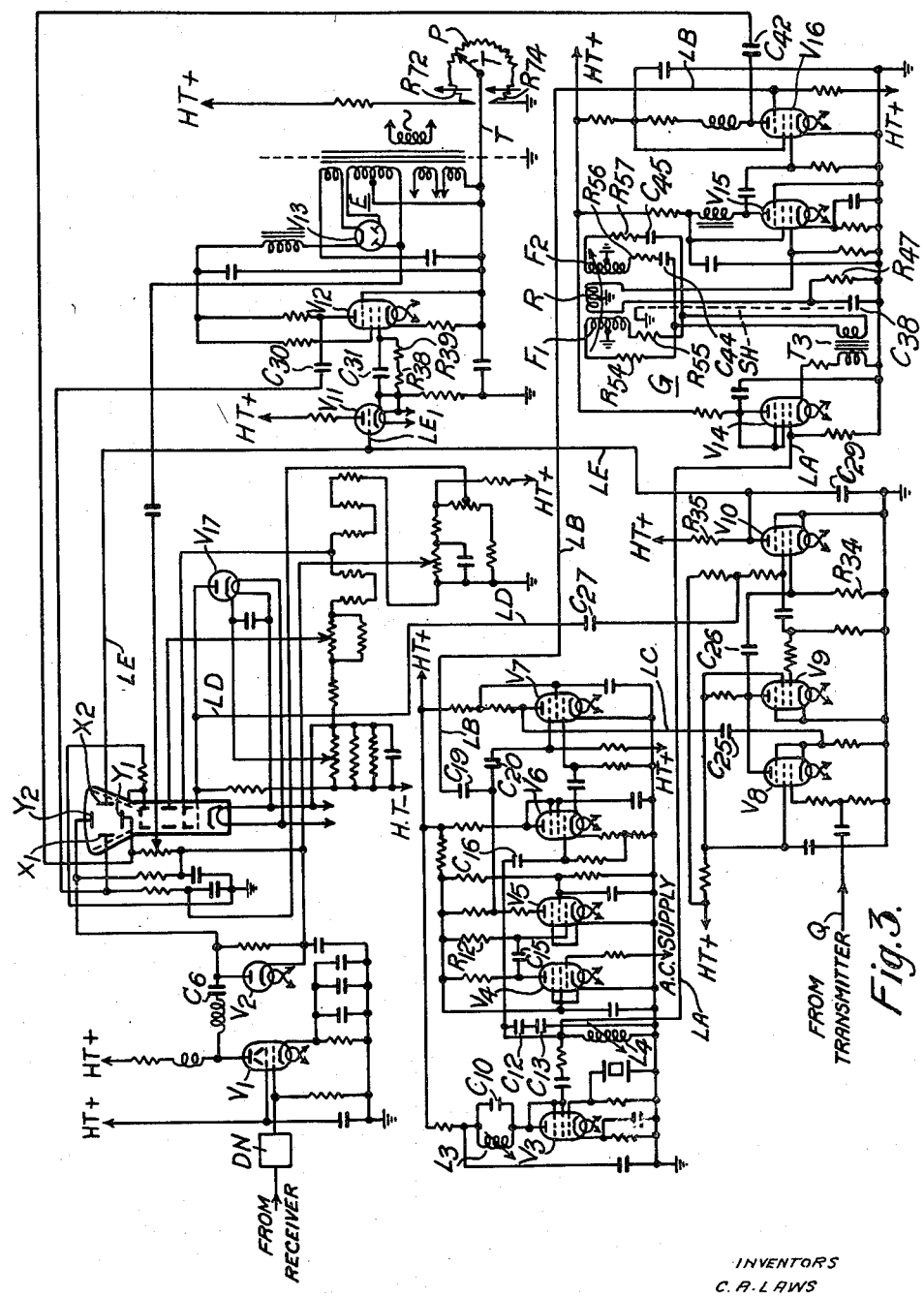

In order that the invention may be readily understood an example thereof will now be described with reference to the accompanying drawings in which:

Figures 1 and 1A represent pictorially the screen of a cathode ray tube on which two correlated time-sweeps are presented, and Figures 2, 3 and 3A are circuit diagrams of apparatus according to the invention.

A type A-scan cathode ray tube is one in which signal amplitude and time are presented on rectangular co-ordinates, and as the range of an object is proportional to echo-time, the luminescent screen indicates echo-signal amplitude plotted against object range.

In one way of carrying the invention into effect in connection with a radar installation, a cathode ray tube is supplied with two main time-sweeps A, B, which are synchronized with the alternate half-cycles of a 500 cycles per second alternator controlling the repetition-frequency of the equipment. One sweep A is initiated by one half-cycle through a direct impulse from the radar transmitter, and shows the traces of the exploring pulse and the returned echo-signals. The other sweep B is initiated during the next half-cycle, when the transmitter is idle, by the first impulse derived from a crystal-stabilized oscillator to occur within a pulse derived from the alternator and carries a train of calibration pips at intervals corresponding to the time taken for signals to be received and reflected back from objects at multiples of 1000 yards range from the transmitter. Both sweeps cover an effective range of say 30,000 yards, and appear continuously owing to the persistence of visual impression. Echo-signals are applied so as to deflect the electron stream upwards, whilst the calibration voltages are arranged to produce a train of downwardly-deflected markings.

In Figure 1 two correlated time-sweeps A, B are represented as seen on the screen of a cathode ray tube, the upper sweep A showing the ground-return S from an outgoing signal and typical echo-traces S1, S2. The lower sweep B carries a train of calibration marks M and a movable datum mark M1 the nature of which is hereinafter described. Both of the sweeps are shown expanded in the vicinity of the ground-trace S, whilst in Figure 1A the expanded section has been moved to embrace the echo-trace S2, and the datum mark M1 is aligned with it.

The main object of providing means for expanding any desired part of the view presented by both time-sweeps is to permit a more detailed scrutiny of the traces in the vicinity of a particular echo-signal. For this purpose one of the X deflecting plates of the cathode ray tube is supplied at the appropriate time with a voltage which increases the speed of both sweeps over a distance of, say, 500 yards on each side of the signal. This effect may be compared with the application of a magnifying lens to a selected 1000 yards section of both time-sweeps.

According to a feature of the invention, the movable datum mark M1 is moved relatively to its time-sweep by a phasing-control which is applied between the generator from which the frequency of the calibration marks is derived and the appropriate X-plate of the cathode ray tube, so as to allow the datum calibration mark M1 to be aligned with a selected echo-trace. The phasing-control is ganged to and synchronized with a control for selecting the part of the time-sweep which it is desired to expand. Under these conditions, the operation of aligning the echo and datum calibration mark results in a direct indication being given on a graduated dial, associated with the common control shaft, of the distance of the reflecting body from the point of observation.

Figure 2 is a block diagram showing the inter-relation of the timing and phasing circuits. Two separate sources of frequency are used in co-operation, one being a 500 cycle alternator ALT. which controls the repetition frequency of the exploring radar signal and of the two main time-sweeps, and the other being a crystal-stabilized valve-oscillator V3 which generates a train of calibration frequencies for one of the time-sweeps corresponding to the time intervals between signals from objects differing in physical range by 1000 yards.

The first half-cycle of the alternator fires the radio-transmitter TRANS. which directly triggers one time-sweep through a lead Q. This sweep is applied from a time-base generating circuit V10 to the X2-plate of the cathode ray tube, and records the echo-signals which are fed to the Y2-plate by the video-amplifier V1 of receiver RCVR. The next half-cycle of the alternator excites a valve V5 which, in response, delivers a 300 microsecond pulse directly to the suppressor grids of two dual-control valves V7, V16. Meanwhile the oscillator V3 feeds a constant train of calibration frequencies to the control grid of the valve V7, and indirectly, through a phasing-device G, to the control grid of the valve V16.

When the valve V7 is conditioned by the coincidence of a pulse received from the valve V5 with one received from the calibration oscillator V3, it triggers the time-base generating circuit V10, which thereupon generates the second time-sweep and feeds it to the X2-plate of the cathode ray tube. Simultaneously the calibration frequencies fed from V3 through the phasing-device G, to the control grid of the valve V16 are released by the arrival on the suppressor grid of V16 of the pulse from the valve V5 and are applied to the Y1-plate of the cathode ray tube to appear on the second time-sweep. It should be observed that the output from both of the dual-control valves V7 and V16 is suppressed during the first half-cycle of the alternator.

The speed of both the main time-sweeps is increased, over a selected section by a dual-control valve V12 which develops an accelerating voltage and applies it to the X1-plate of the cathode ray tube at a moment which is determined by the setting of a variable control tapping T on a potential divider P. This enables any selected echo-signal to be examined in detail. The movable tapping T and the rotary coil of the phasing-device G are both geared to a common control shaft S which carries a graduated dial D and a range indicating pointer N.

The circuit details of the equipment are shown in Figure 3.

A crystal-controlled valve V3 generates a continuous train of sine-waves at a frequency of approximately 164 kilocycles per second, corresponding to a calibration spacing of 1000 yards. An anode circuit comprising inductance L3 and condenser C10 is loosely coupled to a filter circuit comprising inductance L4 and condensers C12, C13, both circuits being tuned to, or nearly to, the crystal frequency. From the filter circuit the sine-wave output is fed, in part, through a condenser C16 and a cathode-loaded buffer valve V6 to the control grid of a dual-control valve V7, and in part, through a lead LA and an amplifier V14 to the field-coils F1, F2 of a phasing-variocoupler G.

Meanwhile the 500 cycles per second supply from the alternator is applied, via a limiting resistor, to the control grid of a valve V4, which is cut off during the negative half-cycle and converts the positive half-cycle into a square-shaped pulse. This is differentiated by a condenser C15 and resistor R12, and applied to a valve V5, which gives, in response, a limited square-shaped positive pulse of approximately 300 microseconds duration. This serves as a switching pulse and is applied in part through a condenser C20 to the suppressor grid of the dual-control valve V7, and in part through a condenser C19 and a lead LB to the suppressor grid of a dual-control valve V16. It will be seen, therefore, that the crystal oscillator V3 feeds calibration waves constantly through the valve V14 into the phasing-variocoupler G, the output from which passes to the control grid of a valve V15. In addition, the oscillator V3 supplies the same train of waves constantly to the control grid of the valve V7 via the buffer valve V6.

When the dual-control valve V7 is also conditioned by the application to its suppressor grid of the switching voltage from the valve V5, it supplies a train of negative impulses through a lead LC and a condenser C25 to the cathode of a valve V8 in the time-base generating circuit, thereby rendering the valve V8 conductive. The main time-base generating circuit is thus alternately triggered, first by a positive impulse applied through the lead Q to the control grid of valve V8, the impulse being derived from the transmitter during the negative half-cycle of the alternator, and next by the first negative impulse applied to the cathode of valve V8 from the valve V7 during the positive half-cycle of the alternator. The first time-sweep shows the echo-signals, and the second carries the calibration marks.

Each time the valve V8 is rendered conductive, it triggers a multi-vibrator relay consisting of two valves V9, V10, the anode of V9 being coupled to the control grid of V10, and the screening grid of the latter being coupled to the control grid of the former. The relay responds by developing on the screen grid of the valve V10 a square positive wave, which last for, say, 300 microseconds, as determined by the time-constant of a condenser C26 and resistor R34, and is fed through a condenser C27 and a lead LD to the grid of the cathode ray tube to brighten the sweep trace. A diode V17 is provided to limit the amplitude of the brightening pulse. During the same period the voltage applied to the control-grid of the valve V10 cuts off the current through that valve, and so allows a condenser C29 to charge up through a resistor R35. The resulting sweep voltage is fed through a lead LE to the X2-plate of the cathode ray tube.

In order to open-out or magnify a selected section of the main time-sweep, it is necessary to develop a voltage which can be timed to start at any desired point along the sweep. For this purpose, the sweep voltage from the condenser C29 is applied through leads LE and LE1, and a valve VII, to the control grid of a valve VI2, which is supplied from a separate "floating" source F of high tension. The conductivity of the valve VI2 is thus determined by the dual control of the voltage applied from the condenser C29 to its control grid and of the voltage applied to its cathode from a variable tapping T on a potential divider P. The resistance of the potential divider is so graded that the voltage derived from the tapping T varies substantially exponentially along the length of the divider in a similar manner to the variations in the voltage developed by the condenser C29. Owing to its cathode load, the grid and cathode voltages of the valve VII keep approximately at the same value, and since the cathode of VII is coupled through resistors R38, R39 to the grid of the valve VI2, that grid will follow the excursion of the sweep voltage from the condenser C29. At a point along the time-sweep which depends upon the position of the tapping T on the potential divider P, the grid and cathode voltages combine to render the valve conductive. The anode voltage of VI2 then falls sharply for a period of about six microseconds and thereafter remains stationary for the rest of the main time-sweep. This voltage drop is applied through a condenser C30 to the XI-plate, which is opposite to that carrying the main sweep voltage, and accordingly serves to increase the effective speed of the sweep for a period corresponding to a distance of say 1,000 yards. The valve VII acts as a buffer to prevent the production of the fast time-sweep from loading the valve VI0 and so distorting the main time-sweep. A shunt condenser C31 prevents the grid resistors R38, R39 from delaying the start of the fast sweep at short ranges.

The circuit illustrated in Figure 3A is designed to avoid the necessity for using a separate source of high tension, such as that provided at E in Figure 3 by full-wave rectifier VI3. In this alternative arrangement, voltage from the main time-base condenser C29 is fed to one control grid CG1, whilst voltage from the potential divider tapping T is applied to the second control-grid CG2, of a two-stage valve VIIA having a common cathode load RC which carries a high negative bias. The two stages are intercoupled to form a multivibrator relay, which is triggered when the voltages on the two grids acquire a predetermined relative value, irrespective of their absolute values.

As the voltages on the two grids approach each other, the discharge current through the valve VIIA is suddenly diverted from the right to the left-hand stage, this change being accelerated by a feed-back condenser CI. The resulting voltage rise at the right-hand anode is applied through a condenser C2 to render a valve VIIB conductive, and thus to allow a condenser C3, which then holds a charge determined by a limiter diode VIIC, to discharge for, say, six microseconds, as determined by the value of a resistor RI. The falling voltage from the condenser C3 is fed through a lead LK to the XI-plate of the cathode ray indicator tube and serves to increase the speed of the main time-sweep as before.

At any setting of the selector tapping T along the potential divider P, the high-speed time-base will enlarge or magnify some section of the main time-sweep over a distance corresponding to one thousand yards. In operation the control-shaft S, Figure 2, is adjusted until the enlarged section embraces a selected echo-trace.

Simultaneously the phasing variocoupler G moves the whole train of calibration marks across their time-sweep to bring a datum mark into alignment with the selected trace, the datum mark being produced by the permanent expansion of a single calibration mark. Since the calibrated time-sweep is synchronized with the fixed frequency of the 500 cycle alternator and also with the first pulse derived from the crystal stabilized oscillator, any movement of the marks must involve an advance or retardation of their initial phase relatively to the start of the time-sweep. The amount of phase-shift provides a convenient method of measuring the time-interval between the outgoing signal and the returned echo, or in other words the range or distance of the reflecting body. The movement of the phasing and fast time-base controls, however, does not alter the relative timing of the expanded calibration mark forming the datum mark and the expanded time-base section.

The phasing variocoupler G is inserted in Figure 3 between the source V3 of the calibration marks and the dual-control valve VI6 which presents them to the cathode ray indicator tube. The rotary coil R of the variocoupler G and the rotary tapping T of the tapered potential divider P are both operated from the common control shaft S, Figure 2, through gearing which ensures that a movement of the tapping T through a distance corresponding to 1,000 yards along the upper time-base is automatically accompanied by an advance or retardation of the phase of the calibration marks relatively to the start of their time-base by one complete cycle of 360 degrees, according to the direction of rotation of the control handle. The phase-change is progressive, that is, two complete rotations correspond to a phase-change of 720 degrees, three to 1,080 degrees and so on, the relationship being accurately maintained for smaller angles of rotation.

As explained with reference to Figure 2, the movable tapping T of the potential divider P is connected to a control shaft S which carries a graduated dial D and a range-indicating pointer N. In order to enable the beginning of each trace appearing on the screen of the cathode ray tube to be aligned with the zero indication of the pointer N on the scale D, a variable resistor R74, shown in Figure 3, is connected in series with the potential divider P and a further variable resistor R72 is also connected in series with the potential divider P to enable the movement of the fast scan across the screen to be synchronized accurately with the movement of the calibration marks as the common control shaft S is rotated. Once the variable resistors R74 and R72 have been adjusted, the distance of any selected reflecting body is automatically shown on the scale D as the datum calibration mark is brought into line with the corresponding echo-trace on the time-sweep.

Calibration frequencies from the crystal-controlled oscillator V3 are fed to the field-coils, F1, F2 of the phasing variocoupler G through the amplifier VI4 and a transformer T3 which gives a balanced input. Phasing resistances R54, R55, R56, R57 and condensers C44, C45 in the feed circuit are arranged to divide the input into two equal currents which flow through the coils F1 and F2 in quadrature. As shown, both the field-coils are centre-tapped to earth, so that the equivalent circuit is a quadrature network, the effective impedances of the two halves being equal and purely resistive. The output taken from the rotary coil R is thus of constant amplitude, but is shifted in phase relatively to the input by an amount which depends on the angle and direction through which the coil R is rotated. As shown the rotary coil is also centre-tapped to earth, one half of the output being taken by a suitable load circuit C39, R47, whilst the other half is applied through a shaping amplifier V15 to the dual-control valve V16. From here the phase-displaced calibration marks are fed through a condenser C42 to the Y1-plate of the indicator tube. Alternatively the full output voltage from the rotary coil R may be applied across the grid and cathode of the amplifier V15.

The input and output amplifiers associated with the variocoupler G are carefully screened from each other as indicated by the dotted line SH connected to ground indicating a suitable shield.

It has been found that the field and search coil assembly of a goniometer such as is employed in direction-finding is well adapted to be used for variocoupler G, the field coils thereof being utilized as fixed quadrature coils $F_1$ and $F_2$ and the search coil as rotary secondary coil R in the manner above-described.

Meanwhile the incoming echo-signals are fed from the receiver of the radar set to a video amplifier V1 through a delay network DN which serves to bring the first or ground-wave trace clearly within the field of the upper time-base. The amplified signals pass through a condenser C6 to the Y2-plate of the indicator tube and are presented against the upper time-sweep. The direct-current component lost in the coupling condenser C6 is restored by a diode V2.

It will be appreciated that the invention is applicable to object-locating and -detecting systems in which radiation of electromagnetic waves other than radio-frequency, for example infrared rays, or radiation of sonic or supersonic frequencies are transmitted and the objects are located and detected by the reception of echoes produced by the objects.

Numerous additional applications of the principles above-disclosed in the embodiments shown will occur to those skilled in the art and no attempt has been made to exhaust such possibilities. The scope of this invention is defined in the following claims.

What is claimed is:

1. In apparatus of the class described the combination of a cathode ray tube, a time-sweep circuit therefor which provides two time-sweeps, a calibration marker generator connected to said cathode ray tube to modify one time-sweep trace to produce calibration markers, a receiver connected to said cathode ray tube to modify the trace of the other time-sweep to indicate returned signals, and a supplementary circuit for increasing the rate of sweep of a portion only of corresponding parts of the two time-sweeps.

2. Apparatus according to claim 1 wherein the two time-sweeps are produced alternately.

3. Apparatus according to claim 2 including a control for said supplementary circuit for shifting each increased rate sweep portion and its respective time-sweep relative to one another.

4. Apparatus according to claim 3 wherein a control is provided for shifting said calibration markers and their time-sweep relative to one another.

5. Apparatus according to claim 4 wherein said shifting control and supplementary circuit control are ganged together for simultaneous operation.

6. Apparatus according to claim 5 wherein said shifting control and supplementary circuit control are simultaneously adjustable by means of a calibrated control.

7. In apparatus of the class described the combination of a cathode ray tube, a time-sweep circuit therefor which provides two time-sweeps producing separate parallel traces on the cathode ray tube, and a calibration marker generator for modifying one time-sweep trace only to produce calibration markers and wherein a receiver modifies the trace of the other time-sweep only to indicate returned signals.

8. Apparatus according to claim 7 wherein a control is provided for shifting said calibration markers and their time-sweep relative to one another.

9. In apparatus of the class described the combination of a cathode ray tube, a time-sweep circuit therefor which provides two time-sweeps, and a calibration marker generator for modifying one time-sweep trace to produce calibration markers and wherein a receiver modifies the trace of the other time-sweep to indicate returned signals and the time-sweep circuit is first triggered by one half-cycle of a master frequency source to produce the first time-sweep and is thereafter triggered by said calibration marker generator through a relay valve when the relay valve is also conditioned by the succeeding half-cycle of the master frequency source to produce the second time-sweep.

10. Apparatus according to claim 9 wherein the first trigger impulse is applied to the control-grid and the second trigger impulse is applied to the cathode of a valve which relays each impulse to operate said time-sweep circuit.

11. In apparatus of the class described the combination of a cathode ray tube, a time-sweep circuit therefor which provides two time-sweeps, and a calibration marker generator for modifying one time-sweep trace to produce calibration markers and wherein a receiver modifies the trace of the other time-sweep to indicate returned signals and the speed of both time-sweeps is simultaneously increased at and for a time which is determined by the output from a relay which is subject to the control of a voltage which is synchronized with the recurrence frequency of the time-sweep circuit and of a voltage which depends on the position of an adjustable tapping on a calibrated potential divider.

12. Apparatus according to claim 11 wherein said relay comprises a valve multivibrator having a common cathode load and is triggered by the relative value of the operating voltages applied to the two control grids thereof.

13. Apparatus according to claim 12 wherein a cathode follower valve is connected between said sweep circuit and said supplementary circuit so as to act as a buffer preventing the production of the increased rate sweep from distorting the main time-sweep.

14. Apparatus according to claim 13 wherein the winding of said potential divider is so graded as to develop a substantially exponential voltage gradient along the length thereof in operation.

15. In apparatus of the class described the combination of a cathode ray tube, a time-sweep circuit therefor which provides two time-sweeps, and a calibration marker generator for modifying one time-sweep trace to produce calibration markers and wherein a receiver modifies the trace of the other time-sweep to indicate returned signals and calibrating voltages from the calibration marker generator are fed directly to one valve and through a phase-shifting device to a second valve so that when both valves are also conditioned by voltages derived from a master frequency source, the first valve triggers the time-sweep circuit and the second valve passes the calibration voltages to the cathode ray tube to modify the resulting time-sweep trace to produce the calibration markers.

16. Apparatus according to claim 15 wherein the phase-shifting device comprises a phase-shifting transformer having two fixed quadrature primary windings and a secondary winding which is adjustable relative thereto.

17. Apparatus according to claim 16 wherein the adjustable secondary winding of the phase-shifting transformer is calibrated so as to indicate the movement of a datum calibration marker along the calibration marker time-sweep.

18. Apparatus according to claim 17 wherein the speed of both time-sweeps is simultaneously increased at and for a time which is determined by the output from a relay which is subject to the control of a voltage which is synchronized with the recurrence frequency of the time-sweep circuit and of a voltage which depends on the position of an adjustable tapping on a calibrated potential divider and wherein the adjustable tapping on the calibrated potential divider is mechanically ganged to the adjustable secondary winding of the phase-shifting transformer.

19. Apparatus according to claim 18 wherein the phase-shifting transformer comprises the field and search coil assembly of a goniometer.

20. In apparatus of the class described the combination of a cathode ray tube, a time-sweep circuit therefor which provides two time-sweeps, a calibration marker generator connected to said cathode ray tube to modify one time-sweep trace to produce calibration markers, a receiver connected to said cathode ray tube to modify the trace of the other time-sweep to indicate returned signals, a supplementary circuit for increasing the rate of sweep of a portion only of corresponding parts of the two time-sweeps, and a control for said supplementary circuit for shifting the increased rate sweep portion and the time-sweep relative to one another.

21. The method of accurately determining the range to an object producing a returned echo signal on the trace of a cathode ray tube screen of a radar system comprising the steps of generating a series of precisely spaced markers, applying these markers to said cathode ray tube adjacent the trace bearing the echo signal, expanding the echo signal bearing trace at and adjacent the echo signal, and simultaneously expanding the corresponding portion of the trace bearing said markers and varying the phase of the markers and hence their position on the cathode ray tube relative to the echo, whereby a marker can be accurately aligned with the echo by varying the phase of the marker relative to the echo and because of the expansion of both the echo bearing trace and the marker bearing trace adjacent the echo and the marker respectively.

22. The method of accurately determining the range to an object producing a returned echo signal on the trace of a cathode ray tube screen of a radar system comprising the steps of generating a series of precisely spaced markers, applying these markers to said cathode ray tube adjacent the trace bearing the echo signal, and varying the phase of the markers and hence their position on the cathode ray tube relative to the echo, whereby a marker can be accurately aligned with the echo.

CECIL ALFRED LAWS.
RICHARD JULIUS PUMPHREY.
OSBERT LINN RATSEY.
DANIEL STEWART WATSON.

REFERENCES CITED

The following references are of record in the file of this patent:

UNITED STATES PATENTS

| Number | Name | Date |
|---|---|---|
| 2,215,197 | Sherman | Sept. 17, 1940 |
| 2,368,448 | Cook | Jan. 30, 1945 |
| 2,375,709 | Thompson | May 8, 1945 |
| 2,386,728 | Theisen | Oct. 9, 1945 |
| 2,405,238 | Seeley | Aug. 6, 1946 |
| 2,413,063 | Miller | Dec. 24, 1946 |
| 2,419,541 | De Rosa | Apr. 29, 1947 |
| 2,426,201 | Grieg | Aug. 26, 1947 |
| 2,438,904 | De Rosa | Apr. 6, 1948 |
| 2,453,711 | Isbister | Nov. 16, 1948 |
| 2,471,373 | Joyner | May 24, 1949 |